United States Patent
Katiyar et al.

(10) Patent No.: US 11,579,678 B2
(45) Date of Patent: Feb. 14, 2023

(54) SOFTWARE SWITCH AND METHOD THEREIN

(71) Applicant: Telefonaktiebolaget LM Ericsson (publ), Stockholm (SE)

(72) Inventors: Nitin Katiyar, Bangalore (IN); Vishal Deep Ajmera, Bangalore (IN); Keshav Gupta, Bangalore (IN); Anju Thomas, Bangalore (IN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 177 days.

(21) Appl. No.: 17/256,773

(22) PCT Filed: Jul. 2, 2018

(86) PCT No.: PCT/IN2018/050431
§ 371 (c)(1),
(2) Date: Dec. 29, 2020

(87) PCT Pub. No.: WO2020/008468
PCT Pub. Date: Jan. 9, 2020

(65) Prior Publication Data
US 2021/0141435 A1    May 13, 2021

(51) Int. Cl.
*G06F 1/324* (2019.01)
*G06F 9/455* (2018.01)
*G06F 9/50* (2006.01)

(52) U.S. Cl.
CPC .......... *G06F 1/324* (2013.01); *G06F 9/45533* (2013.01); *G06F 9/5077* (2013.01)

(58) Field of Classification Search
CPC ..... G06F 1/324; G06F 9/45533; G06F 9/5077
See application file for complete search history.

(56) References Cited

U.S. PATENT DOCUMENTS 8,190,769 B1 * 5/2012 Shukla ................ H04L 12/4625
                                                         718/104
8,856,518 B2 * 10/2014 Sridharan ............ H04L 45/586
                                                         713/162

(Continued)

FOREIGN PATENT DOCUMENTS

| CN | 2012164032 A | 8/2012 | |
| CN | 106527653 A | 3/2017 | |
| WO | WO-2018013023 A1 * | 1/2018 | ........... G06F 1/3206 |

OTHER PUBLICATIONS

International Search Report and Written Opinion dated Oct. 15, 2018 for International Application No. PCT/IN2018/050431 filed on Jul. 2, 2018, consisting of 16-pages.

*Primary Examiner* — Aurel Prifti
(74) *Attorney, Agent, or Firm* — Christopher & Weisberg, P.A.

(57) ABSTRACT

A software switch and a method performed by the software switch are disclosed. The software switch receives, from a node deploying a virtual machine, a request for a virtual port to be polled by the virtual machine. The request includes a Central Processing Unit "CPU" identity identifying a CPU on which the virtual machine executes. The request includes an indication of a clock frequency at which the CPU is set to operate. The software switch determines a number of packets in a queue associated with the virtual port. The software switch adjusts the clock frequency of the CPU based on the number of packets in the queue. A corresponding computer program and a computer program carrier are also disclosed.

21 Claims, 5 Drawing Sheets

(56) References Cited

U.S. PATENT DOCUMENTS

| | | | | |
|---|---|---|---|---|
| 9,100,289 B2* | 8/2015 | Mehta | ............... | G06F 9/45558 |
| 11,196,590 B2* | 12/2021 | Park | ............... | H04L 12/4633 |
| 11,252,070 B2* | 2/2022 | Wang | ............... | H04L 43/0817 |
| 11,271,776 B2* | 3/2022 | Nagaraj | ............... | H04L 43/20 |
| 2004/0123169 A1* | 6/2004 | Elnozahy | ............... | G06F 1/3209 |
| | | | | 713/320 |
| 2013/0227566 A1* | 8/2013 | Higuchi | ............... | G06F 9/5088 |
| | | | | 718/1 |
| 2014/0047125 A1* | 2/2014 | Hyoudou | ............... | H04L 12/46 |
| | | | | 709/232 |
| 2014/0310377 A1* | 10/2014 | Matsuoka | ............... | H04L 41/40 |
| | | | | 709/217 |
| 2015/0003282 A1* | 1/2015 | Gourlay | ............... | H04L 49/65 |
| | | | | 370/254 |
| 2015/0100962 A1* | 4/2015 | Morita | ............... | H04L 67/1004 |
| | | | | 718/1 |
| 2018/0077020 A1* | 3/2018 | Li | ............... | H04L 41/5054 |

* cited by examiner

SOFTWARE SWITCH AND METHOD THEREIN

CROSS-REFERENCE TO RELATED APPLICATIONS

This application is a Submission Under 35 U.S.C. § 371 for U.S. National Stage Patent Application of International Application Number: PCT/IN2018/050431, filed Jul. 2, 2018 entitled "SOFTWARE SWITCH METHOD THEREIN," the entirety of which is incorporated herein by reference.

TECHNICAL FIELD

Embodiments herein relate to computer systems, such as networks of computer resources, cloud systems or the like. In particular, a method and a software switch e.g. for managing power consumption of the software switch are disclosed. A corresponding computer program and a computer program carrier are also disclosed.

BACKGROUND

A known cloud system, such as a telecommunications cloud, may deploy virtual network functions (VNFs). The cloud system may then be set up as follows. A master node manages resources of the cloud system. The resources may be processing resources, such as Central Processing Units (CPUs) and processor kernels, memory resources, such as hard drives and volatile memory, network resources, such as wireless or wired network cards, and the like. The master node sets up one or more host machines by assembling resources of the cloud system. Furthermore, in a particular host machine the master node may arrange for one or more virtual machines to be executed. The virtual machine is typically an execution environment, such as a container, a virtual java machine, an operating system or the like.

In order for the virtual machines to be able to communicate with each other and entities outside the host machine, the master node instructs a software switch to map one or more physical ports to a virtual port which is associated with a particular virtual machine. In this manner, the master node sets up the particular virtual machine to continuously poll the virtual port for packets. The software switch polls its ports and pushes packets to a respective queue for each virtual port.

However, since the virtual machine continuously polls its respective queue, the CPU(s), allocated to it by the master node, will be very busy. Disadvantageously, power consumption of the host machine, on which the virtual machine executes, is high due to the continuous polling. A further disadvantage is that the continuous polling causes CPU(s) and other surrounding electronics to heat up, whereby power consumption for cooling thereof may be unnecessarily high.

SUMMARY

An object may be to more efficiently manage power consumption in a cloud system of the above mentioned kind.

According to an aspect, the object is achieved by a method, performed by a software switch. The software switch receives, from a node deploying a virtual machine, a request for a virtual port to be polled by the virtual machine. The request comprises a CPU identity identifying a CPU on which the virtual machine executes, and the request comprises an indication of a clock frequency at which the CPU is set to operate at. The software switch determines a number of packets in a queue associated with the virtual port. The software switch adjusts the clock frequency of the CPU based on the number of packets in the queue.

According to another aspect, the object is achieved by a software switch configured for receiving, from a node deploying a virtual machine, a request for a virtual port to be polled by the virtual machine. The request comprises a CPU identity identifying a CPU on which the virtual machine executes, and the request comprises an indication of a clock frequency at which the CPU is set to operate at. The software switch is configured for determining a number of packets in a queue associated with the virtual port. The software switch is configured for adjusting the clock frequency of the CPU based on the number of packets in the queue.

Thanks to that the request comprises the CPU identity, the software switch is made aware of which CPU the virtual machine is executing on. Hence, by use of the identity, the software switch may adjust the clock frequency of the CPU on which the virtual machine executes.

Further, thanks to that the software switch determines the number of packets in the queue associated with the virtual port polled by the virtual machine, the software switch may adjust the clock frequency based on the number of packets in the queue. The number of packets in the queue may be indicative of load on the virtual machine.

As an example, the clock frequency may be decreased when the load appears to be low and the clock frequency may be increased when the load appears to be high as described in more detail herein. Accordingly, as the clock frequency increases power consumption of the CPU increases and as the clock frequency decreases the power consumption of the CPU decreases. Hence, power consumption efficiently managed, e.g. by taking load on the virtual machine into account. In particular, it may be expressed as that the CPU of the virtual machine continuously polls the queue while the clock frequency of the CPU is adjusted based on traffic load on the virtual port.

An advantage is that power consumption of the host machine and/or the cloud system of the above mentioned kind is efficiently managed. Furthermore, e.g. in case the power consumption is reduced, undesired heating of the CPU is also avoided. Moreover, in case the power consumption is reduced, environmental friendliness of the cloud system may be improved thanks to the software switch described herein. Additionally, the embodiments herein may also reduce power needed for cooling of host machines.

Thus, the embodiments herein may provide a method and software switch, which more efficiently manage power consumption in a cloud system of the above mentioned kind.

BRIEF DESCRIPTION OF THE DRAWINGS

The various aspects of embodiments disclosed herein, including particular features and advantages thereof, will be readily understood from the following detailed description and the accompanying drawings, which are briefly described in the following.

DETAILED DESCRIPTION

Throughout the following description, similar reference numerals have been used to denote similar features, such as nodes, actions, modules, circuits, parts, items, elements, units or the like, when applicable. In the Figures, features that are optional and appear in some embodiments are indicated by dashed lines.

Figure 1:
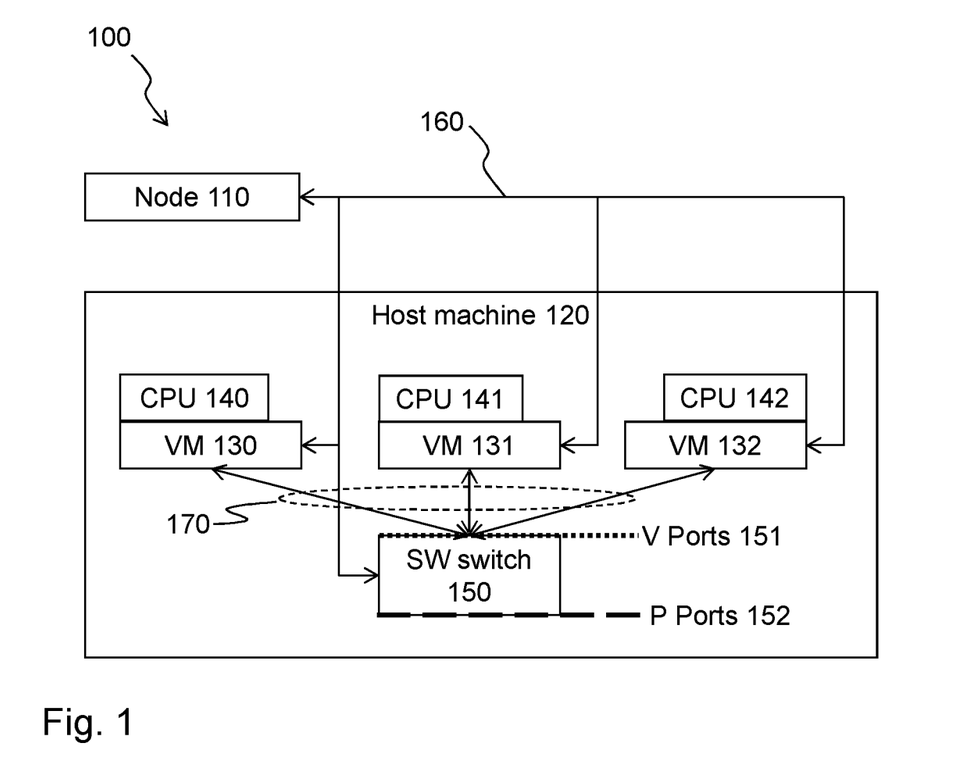
FIG. 1 is a schematic overview of an exemplifying system in which embodiments herein may be implemented.

FIG. 1 depicts an exemplifying system 100 in which embodiments herein may be implemented. In this example, the system 100 is a telco cloud. In other examples, the system 100 may be a computer system, a data center, a cluster of computers, a data system, a server system, a hardware machine system or the like.

The system 100 may be said to comprise a node 110, which may be responsible for various tasks, such as resource allocation, deployment of virtual machines (VMs) etc. Resource allocation may e.g. refer to which hardware resources, such as memory, processing units, network capabilities that may be allocated, e.g. used, by which VM. In related literature, the node 110 may be referred to as an orchestrator, a master node, a central managing node, a host machine managing node or the like.

The system 100 may further be said to comprise a host machine 120, such as a logical host machine assembled from resources of the system 100 according to known manners, a hardware host machine, a computer, a server or the like.

The host machine 120 comprises one or more virtual machines, denoted VM, 130, 131, 132. The node 110 may have scheduled the virtual machines 130, 131, 132 to be executed on the host machine 120.

Each VM 130, 131, 132 is associated with a respective set of CPUs 140, 141, 142. This means that each VM 130, 131, 132 may be executed by one or more CPUs. As shall be understood from the description below, each VM 130, 131, 132 may typically have a respective dedicated CPU that may be responsible for continuously polling for packets.

Moreover, the host machine 120 comprises a software (SW) switch 150. The software switch 150 may manage one or more virtual ports 151 and one or more physical ports 152.

The node 110 may communicate 160 with the software switch 150 and each of the virtual machines 130, 131, 132. In this manner, requests, messages, responses, indications and generally information may be exchanged between the node 110 and/or the software switch 150 and/or one or more of the virtual machines 130, 131, 132.

Furthermore, the software switch 150 may communicate 170 with each of the virtual machines 130, 131, 132. In this manner, requests, messages, responses, indications and generally information may be exchanged between the software switch 150 and/or one or more of the virtual machines 130, 131, 132.

Figure 2:
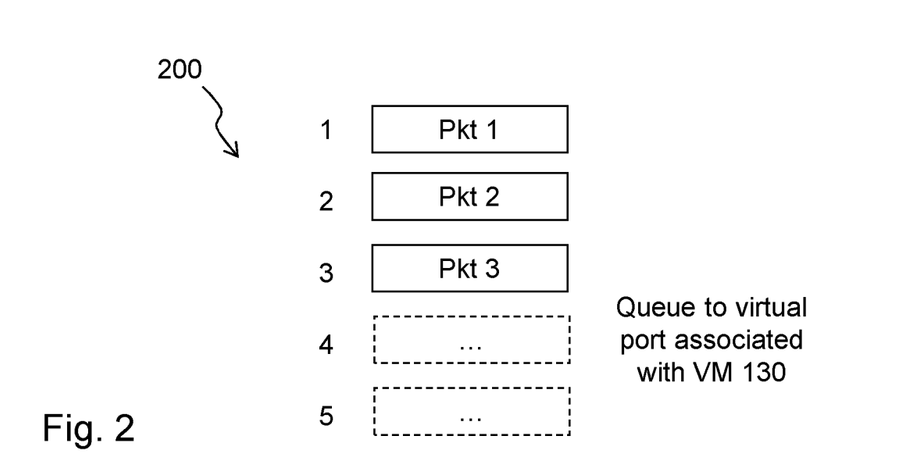
FIG. 2 is an illustration depicting a queue of packets destined to a virtual port.

FIG. 2 illustrates an exemplifying queue 200, which may be associated with a virtual port which e.g. is polled by the virtual machine 130. In this example, the number of packets Pkt 1, Pkt 2, Pkt 3 in the queue is three (3) and a size of the queue is five (5) as derived from the indices 1, 2, 3, 4 and 5 to the left of the queue. The size of the queue thus refers to a maximum length, or a maximum number of packets that may be put in the queue. Sometimes, the number of packets in the queue may be referred to as q_len, which then in this example would be q_len=3.

Figure 3:
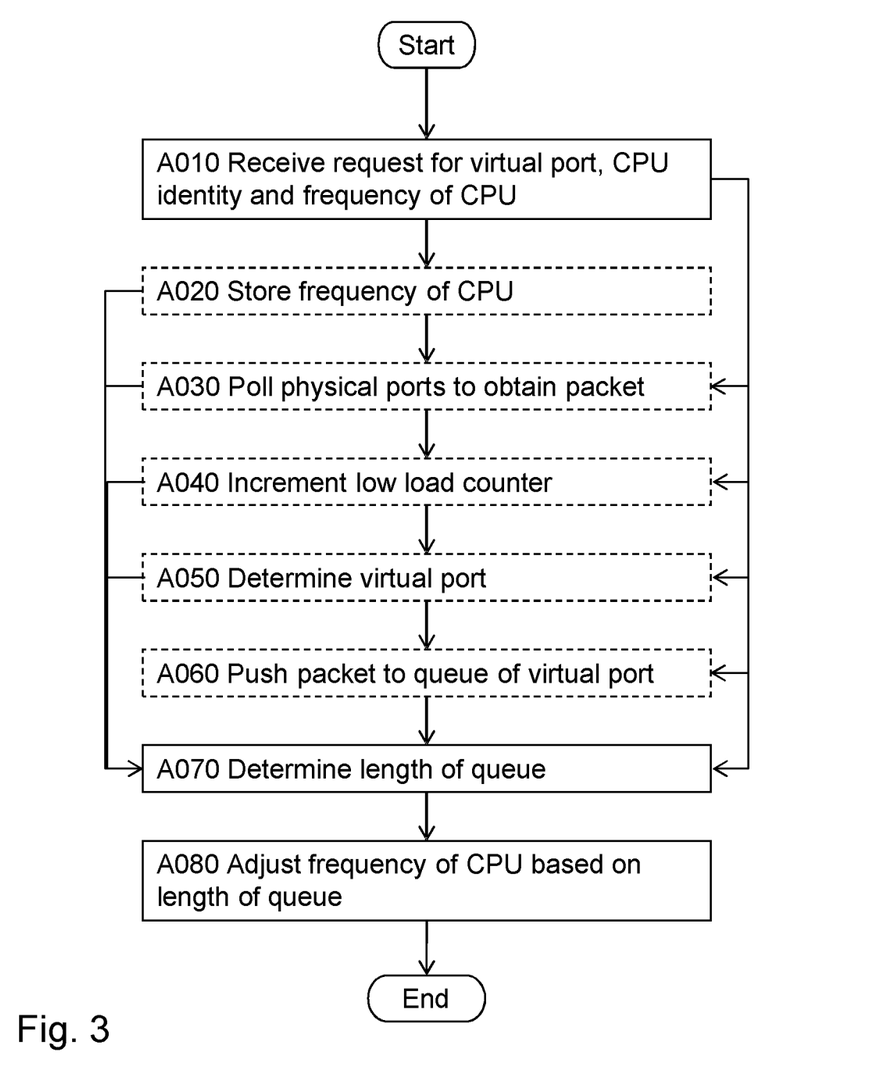
FIG. 3 is a flowchart illustrating embodiments of the method in the software switch.

FIG. 3 illustrates an exemplifying method according to embodiments herein when implemented in the system 100 of FIG. 1. The software switch 150 may thus perform a method for managing power consumption of the host machine 120 and/or a virtual machine 130 and/or at least one virtual machine 130, 131, 132.

One or more of the following actions may be performed in any suitable order.

Action A010

The software switch 150 receives, from a node 110 deploying a virtual machine 130, 131, 132, a request for a virtual port to be polled by the virtual machine 130, 131, 132.

The request comprises a CPU identity (ID) identifying a CPU 140, 141, 142 on which the virtual machine 130, 131, 132 executes. By means of the CPU identity, the software switch 150 may identity which CPU(s) are associated with the virtual port.

The request comprises an indication of a clock frequency at which the CPU 140, 141, 142 is set to operate at. The indication of the clock frequency may be interpreted by the software switch as a current clock frequency, e.g. being a maximum possible clock frequency of the CPU on which the virtual machine executes.

When the node 110 deploys the virtual machine 130, 131, 132, the node 110 may previously have taken a decision to schedule the virtual machine for execution by the host machine 120.

Action A020

Figure 6:
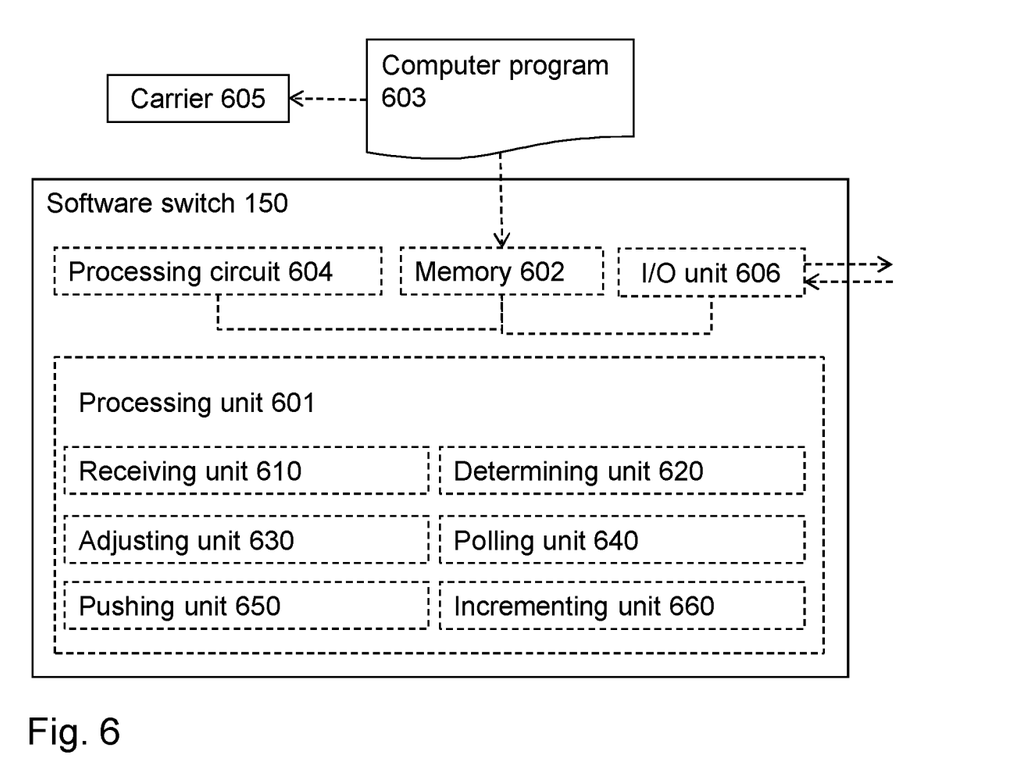
FIG. 6 is a block diagram illustrating an example of the software switch.

The software switch 150 may store the indication of the clock frequency, e.g. in a memory 602 of FIG. 6. In this manner, the software switch 150 may obtain knowledge about e.g. the maximum possible clock frequency when desired as explained herein.

Action A030

The software switch 150 may poll physical ports of the software switch 150 to obtain one or more packets destined to the virtual machine 130, 131, 132.

Action A040

Figure 5:
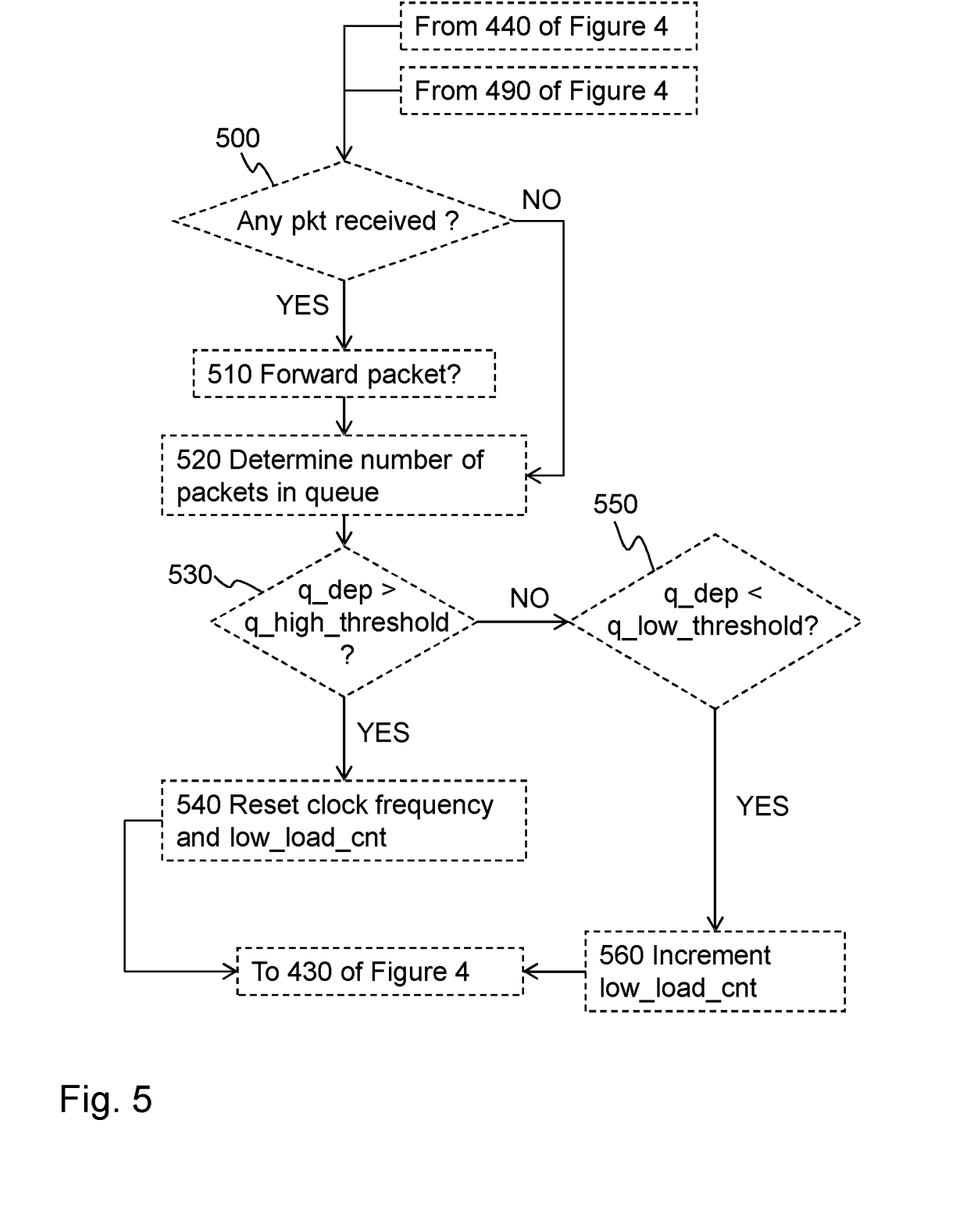

The software switch 150 may increment a low load counter, after each time the polling A030 of the physical port has been performed and when the length of the queue is less than a third threshold value for indicating low load since last time the adjusting A080 of the clock frequency was performed. In FIG. 5, the third threshold may be exemplified by q_low_load_threshold.

Action A050

The software switch 150 may determine, i.e. based on so called forwarding processing on said one or more received packets, the virtual port to be polled by the virtual machine 130, 131, 132. Forward processing may refer to that the software switch 150 may inspect said one or more received packets, or packet headers, to determine the destination port, e.g. the virtual port, to forward to. Hence, said destination port is to be polled by the virtual machine 130, 131, 132.

Action A060

The software switch 150 may push the obtained one or more packets to the queue of the determined virtual port.

Action A070

The software switch 150 determines a number of packets in a queue associated with the virtual port, i.e. the number of packets that are currently present in the queue. Any packets in the queue may be destined to the virtual port.

Action A080

The software switch 150 adjusts the clock frequency of the CPU 140, 141, 142 based on the number of packets in the queue.

In some embodiments, the action A080 of adjusting the clock frequency may comprise adjusting the clock frequency of the CPU 140, 141, 142 based on the number of packets in the queue by decreasing the frequency when the number of packets in the queue is less than a first threshold value for indicating low load at the virtual machine 130, 131, 132, respectively, and by increasing the frequency when the number of packets in the queue is greater than a second threshold value for indicating high load at the virtual machine.

In this manner, the clock frequency may be set to a higher frequency—when load at the virtual machine is higher than the second threshold value—relatively a lower frequency to which the clock frequency may be set when the load at the virtual machine is lower than the first threshold value.

The first threshold may be different from the second threshold. Alternatively, the first threshold may be the second threshold. Expressed differently, the second threshold may be the first threshold. Further, it can be expressed as that the first threshold comprises the second threshold.

Furthermore, the action A080 of adjusting the clock frequency by decreasing the frequency may comprise decreasing the frequency until the clock frequency is less than or equal to a first clock frequency indicating a lower limit for the clock frequency. In this manner, it may be ensured that the clock frequency may be set to at least a lower frequency limit, given by the first clock frequency, irrespectively of how small or low the load at the virtual machine 130, 131, 132 may become. The first clock frequency may be set depending on application and requirements of the system 100. Generally, it may be noted that the smaller or lower the first clock frequency is, the smaller or lower the power consumption may be. At the same time, processing capacity, e.g. in terms of flops per second, may be smaller, the smaller or lower the first clock frequency may become. Hence, the first clock frequency may be set while making a trade-off between maximum achievable power reduction and minimum required processing capacity. The first clock frequency may thus be seen as a lowest allowable frequency, which may be set according to prevailing circumstances.

It may here be noted that the expressions "clock frequency", "first clock frequency" and "second clock frequency" are distinguished, i.e. different, from each other and refers to different frequency values.

Moreover, the action A080 of adjusting the clock frequency by increasing the frequency may comprise increasing the clock frequency until the clock frequency is equal to a second clock frequency indicating an upper limit for the clock frequency. In this manner, it may be ensured that the clock frequency may be set to at most an upper frequency limit, given by the second clock frequency, irrespectively of how great the load at the virtual machine 130, 131, 132 may become. The second clock frequency may usually be set to a maximum possible operating frequency of the CPU, possibly while applying some margin. The second clock frequency may thus be seen as a maximum possible frequency, which may be set according to e.g. prevailing CPU specifications.

In some embodiments, the adjusting A080 of the clock frequency may be performed at regular intervals.

In these embodiments, the adjusting of the clock frequency may be performed at regular intervals based on a number of times the action A030 of polling the physical ports has been performed. In more detail, a reduction of the clock frequency may done at regular interval, while e.g. an increase of the clock frequency may preferably be performed as soon as the second threshold is exceeded. In this manner, a risk of dropped packets is reduced.

Alternatively, the adjusting of the clock frequency may be performed at regular intervals according to a time interval, such as 10 ms, 20 s, 4 min or the like depending on application.

Figure 4:
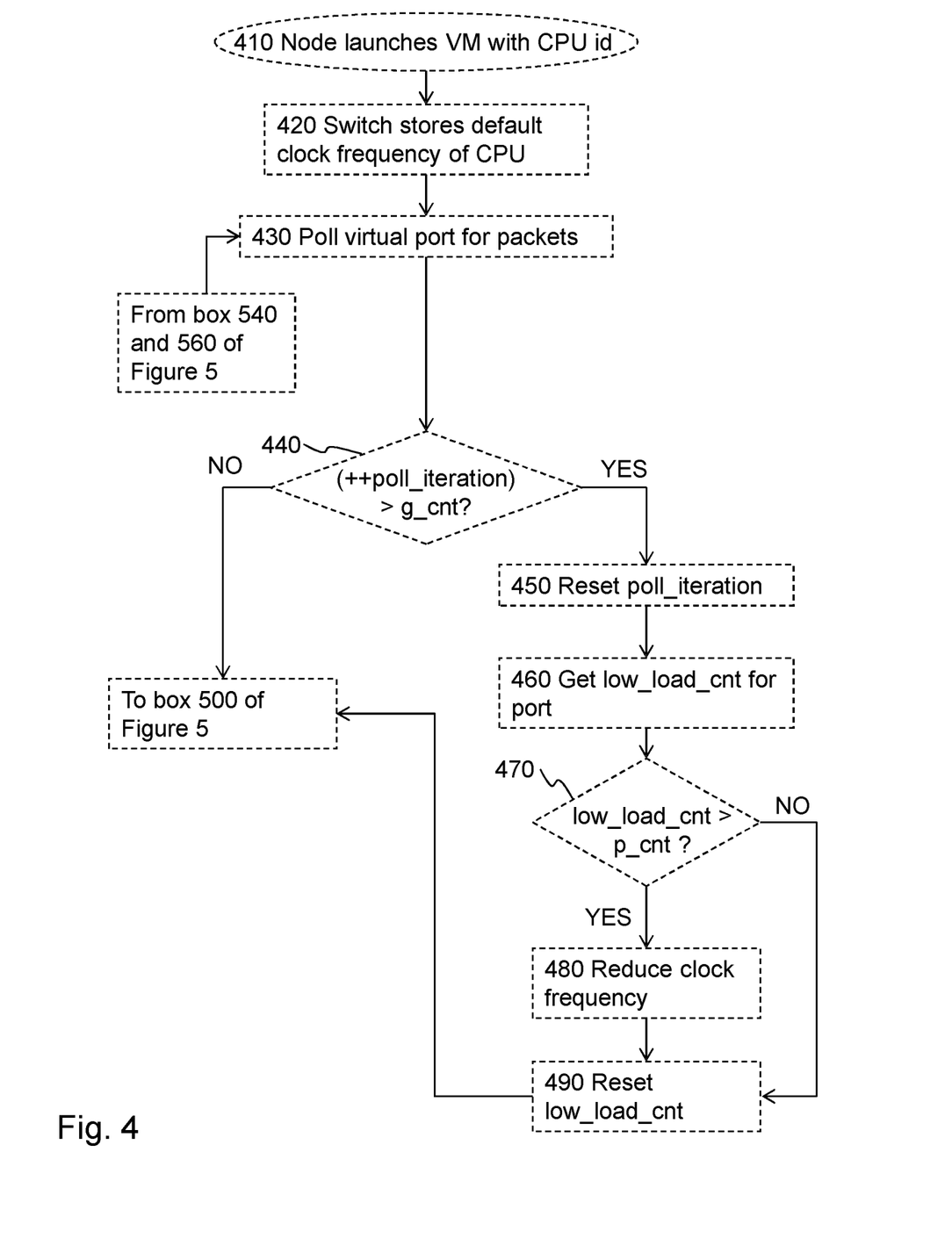
FIG. 4 and FIG. 5 are flowcharts illustrating an example of a method in the software switch.

FIG. 4 and FIG. 5 illustrate a further exemplifying method according to the embodiments herein.

Turning to FIG. 4, one or more of the following actions may be performed.

Action 410

The node 110 launches, such as deploys or the like, a VM with a CPU ID CPUID #1 in the host machine 120.

As an example, during VM creation, the node 110 may need to enable a power management feature according to the embodiments herein for a virtual port created in the software switch 150, wherein the virtual port shall be polled by the VM, being created and/or deployed.

The node 110 may, e.g. when requesting the virtual port, specify the physical core ID, as an example of the aforementioned CPU identity, corresponding to the virtual port that would be used for exchanging, i.e. sending and/or receiving, packets between VM and the software switch 150.

In case, the CPU identity is set to −1, the embodiments herein may preferably not be invoked.

Action 420

The software switch 150 may store, such as record, register or the like, the clock frequency. The clock frequency may be received by the software switch in connection with the request for the virtual port as in action A010. In an example, it may be that the clock frequency is predefined, such as given to the software switch 150 at configuration thereof. Further, it may be that the clock frequency is received by the software switch 150 from the node 110 prior to action A010.

Action 430

The software switch 150 may poll physical ports, such as physical network interface cards (NICs) continuously according to the clock frequency, i.e. according to a default or initial clock frequency.

In this action, the software switch 150 may further increment a global counter, e.g. poll_iteration as shown in FIG. 4.

Action 440

The software switch 150 may check if the global counter poll_iteration is greater than, or equal to, a polling threshold g_cnt for when to regularly adjust, in particular reduce, the clock frequency as in action A030.

Action 450

If the global counter poll_iteration is greater than, or equal to, the polling threshold g_cnt, the software switch 150 may reset the global counter poll_iteration.

Action 460

The software switch 150 may get, such as read, obtain, fetch or the like, a low load counter low_load_cnt for each virtual port of the software switch 150.

Action 470

The software switch 150 may check if the low load counter low_load_cnt is greater than, or equal to, a predefined value, p_cnt, as an example of the third threshold value for indicating low load since last time the adjusting A080 of the clock frequency was performed, e.g. a reduction of the clock frequency was made.

Action 480

If the low load counter low_load_cnt is greater than, or equal to, the predefined value, p_cnt, the software switch 150 may reduce the clock frequency.

Action 490

The software switch 150 may reset the low load counter low_load_cnt irrespectively of outcome of action 470. This may mean that action 490 may be performed before any one or more of actions 450, 460, 470 and 480, but after action 440.

Hence, according to actions 440 to 490, the software switch 150 may check the low load counter low_load_cnt for each of the virtual ports once the poll_iteration counter exceeds g_cnt. If the low load counter low_load_cnt for a virtual port is greater than a predefined value, e.g. p_cnt, the software switch 150 may trigger a reduction of the clock frequency of the associated CPU. The reduction of the clock frequency may in turn yield a reduction of power consumption by that CPU. Finally, the software switch 150 may reset the low load counter low_load_cnt for the virtual port associated with the CPU.

In view of the description of the actions in FIG. 4, it may be noted that one or more of actions 450 to 490 may be performed for one or more of the virtual port of the software switch 150, i.e. at those ports at which it is desired to adjust the clock frequency of the corresponding CPUs.

Now with reference to FIG. 5, one or more of the following actions may be performed for every polling for which the global counter poll_iteration is less than the polling threshold g_cnt.

Action 500

The software switch 150 may check if any packet (pkt) is received.

Action 510

When action 500 results in that the software switch 150 determines that a packet has been received, the software switch 150 may forward the packet to an appropriate virtual port, according to a mapping table, if the appropriate virtual port is identified based on the received packet.

Action 520

The software switch 150 may determine, such as estimate, calculate and the like, a number of packets q_dep, or q_len, in the queue of the virtual port.

Action 530

Subsequent to action 520, the software switch 150 may check if the number of packets q_dep is greater than, or equal to, the second threshold value q_high_threshold for indicating high load at the virtual machine.

Action 540

If the checking of action 530 results in that the software switch 150 finds that the number of packets q_dep is greater than, or equal to, the second threshold value, the software switch 150 may increase the clock frequency towards the default clock frequency, or the software switch 150 may reset the clock frequency to the default clock frequency.

Furthermore, the software switch 150 may reset the low load counter low_load_cnt when the number of packets q_dep is greater than, or equal to, the second threshold value.

Subsequent to action 540, the software switch 150 may proceed at action 430 of FIG. 4.

Action 550

If the checking of action 530 results in that the software switch 150 finds that the number of packets q_dep is less than the second threshold value, the software switch 150 may check if the number of packets q_dep is less than, or equal to, the first threshold value q_low_threshold for indicating low load at the virtual machine.

Action 560

The software switch 150 may increment the low load counter low_load_cnt when the number of packets q_dep is less than, or equal to, the first threshold value. This means that the low load counter low_load_cnt is typically increased by one. However, depending on application, the low load count low_load_cnt may be increased by two, three, four etc. as deemed appropriate.

In view of the actions described above in relation to FIG. 5, it may be noted that actions 520 to 560 may be performed for all virtual ports of the software switch 150 with which a virtual machine is associated.

To conclude, by varying the frequency of CPU given to VM as mentioned above, the software switch 150 may manage the power consumption of the CPUs based on the load/traffic handled by the virtual machines deployed in the host machine 110. Whenever there is low or moderate traffic, the software switch 150 may reduce the clock frequency of the related CPU(s). Thus, an overall power usage by the host machine in the system 100 may be reduced.

Expressed somewhat differently, the embodiments herein may monitor traffic load, e.g. in terms of number of packets in queues, on the virtual ports connected to the virtual machine and utilize this information to tune the clock frequency of the virtual machine's CPU.

With reference to FIG. 6, a schematic block diagram of an example of the software switch 150 of FIG. 1 is shown.

The software switch 150 may comprise a processing unit 601, such as a means for performing the methods described herein. The means may be embodied in the form of one or more hardware units and/or one or more software units. The term "unit" may thus refer to a circuit, a software block or the like according to various embodiments as described below.

The software switch 150 may further comprise a memory 602. The memory may comprise, such as contain or store, instructions, e.g. in the form of a computer program 603, which may comprise computer readable code units.

According to some embodiments herein, the software switch 150 and/or the processing unit 601 may comprise a processing circuit 604 as an exemplifying hardware unit, which may comprise one or more processors. Accordingly, the processing unit 601 may be embodied in the form of, or 'realized by', the processing circuit 604. The instructions may be executable by the processing circuit 604, whereby the software switch 150 is operative to perform the methods of FIG. 3 and/or FIG. 4 and/or FIG. 5. As another example, the instructions, when executed by the software switch 150 and/or the processing circuit 604, may cause the software switch 150 to perform the method according to FIG. 3 and/or FIG. 4 and/or FIG. 5.

In view of the above, in one example, there is provided a software switch 150. Again, the memory 602 contains the instructions executable by said processing circuit 604 whereby the software switch 150 is operative for:

receiving, from a node 110 deploying a virtual machine 130, 131, 132, a request for a virtual port to be polled by the virtual machine 130, 131, 132, wherein the request comprises a Central Processing Unit "CPU" identity identifying a CPU 140, 141, 142 on which the virtual machine 130, 131, 132 executes, and wherein the request comprises an indication of a clock frequency at which the CPU 140, 141, 142 is set to operate at, determining a number of packets in a queue associated with the virtual port, and adjusting the clock frequency of the CPU 140, 141, 142 based on the length of the queue.

FIG. 6 further illustrates a carrier 605, or program carrier, which provides, such as comprises, mediates, supplies and the like, the computer program 603 as described directly above. The carrier 605 may be one of an electronic signal, an optical signal, a radio signal and a computer readable medium.

In some embodiments, the software switch 150 and/or the processing unit 601 may comprise one or more of a receiving unit 610, a determining unit 620, an adjusting unit 630, a polling unit 640, a pushing unit 650 and an incrementing unit 690 as exemplifying hardware units. The term "unit" may refer to a circuit when the term "unit" refers to a hardware unit. In other examples, one or more of the aforementioned exemplifying hardware units may be implemented as one or more software units.

Moreover, the software switch 150 and/or the processing unit 601 may comprise an Input/Output unit 606, which may be exemplified by the receiving unit and/or a sending unit when applicable.

Therefore, according to the various embodiments described above, the software switch 150 and/or the processing unit 601 and/or the receiving unit 610 and/or the processing circuit 604 is configured for receiving, from a node 110 deploying a virtual machine 130, 131, 132, a request for a virtual port to be polled by the virtual machine 130, 131, 132. The request comprises a Central Processing Unit "CPU" identity identifying a CPU 140, 141, 142 on which the virtual machine 130, 131, 132 executes, and wherein the request comprises an indication of a clock frequency at which the CPU 140, 141, 142 is set to operate at.

The software switch 150 and/or the processing unit 601 and/or the determining unit 610 and/or the processing circuit 604 is configured for determining a number of packets in a queue associated with the virtual port.

The software switch 150 and/or the processing unit 601 and/or the adjusting unit 610 and/or the processing circuit 604 is configured for adjusting the clock frequency of the CPU 140, 141, 142 based on the length of the queue.

The software switch 150 may be configured for adjusting the clock frequency of the CPU 140, 141, 142 based on the length of the queue by decreasing the frequency when the length is less than a first threshold value for indicating low load at the virtual machine 130, 131, 132 and by increasing the frequency when the length is greater than a second threshold value for indicating high load at the virtual machine.

The software switch 150 may be configured for adjusting the clock frequency by decreasing the frequency until the clock frequency is less than or equal to a first clock frequency indicating a lower limit for the clock frequency.

The software switch 150 may be configured for adjusting the clock frequency by increasing the frequency until the clock frequency is equal to a second clock frequency indicating an upper limit for the clock frequency.

The software switch 150 and/or the processing unit 601 and/or the polling unit 610 and/or the processing circuit 604 may be configured for polling physical ports of the software switch 150 to obtain one or more packets destined to the virtual machine 130, 131, 132.

The software switch 150 and/or the processing unit 601 and/or the determining unit 610 and/or the processing circuit 604 may be configured for determining the virtual port to be polled by the virtual machine 130, 131, 132.

The software switch 150 and/or the processing unit 601 and/or the determining unit 610 and/or the processing circuit 604 may be configured for pushing the obtained one or more packets to the queue of the determined virtual port.

The software switch 150 may be configured for adjusting the clock frequency at regular intervals.

The software switch 150 may be configured for adjusting the clock frequency at regular intervals based on a number of times the polling of the physical ports has been performed.

The software switch 150 may be configured for adjusting the clock frequency at regular intervals according to a time interval.

The software switch 150 and/or the processing unit 601 and/or the determining unit 610 and/or the processing circuit 604 may be configured for incrementing a low load counter, after each time the polling of the physical port has been performed and when the length of the queue is less than a third threshold value for indicating low load since last time the adjusting of the clock frequency was performed.

The first threshold may be different from the second threshold. Alternatively, the first threshold may be the second threshold. Expressed differently, the second threshold may be the first threshold. Further, it can be expressed as that the first threshold comprises the second threshold.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a cloud system, which may comprise a set of server machines. In case of a cloud system, the term "node" may refer to a virtual machine, such as a container, virtual runtime environment, a software module or the like. The virtual machine may be assembled from hardware resources, such as memory, processing, network and storage resources, which may reside in different physical machines, e.g. in different computers.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a determining means, estimating means, capturing means, associating means, comparing means, identification means, selecting means, receiving means, sending means or the like as disclosed herein. As an example, the expression "means" may be a unit corresponding to the units listed above in conjunction with the Figures.

As used herein, the term "software unit" may refer to a software application, a dynamic link library (DLL), a software component, a software module, a software object, an object according to component object model (COM), a software function, a software engine, an executable binary software file or the like.

The terms "processing unit" or "processing circuit" may herein encompass a processing unit, comprising e.g. one or more processors, an application specific integrated circuit (ASIC), a field-programmable gate array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a universal serial bus (USB) memory, a digital versatile disc (DVD), a Blu-ray disc, a software module that is received as a stream of data, a Flash memory, a hard drive, a memory card, such as a MemoryStick, a multimedia card (MMC), secure digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a software switch comprising a virtual port and being configurable to communicate with a virtual machine using the virtual port, the virtual machine being executable by a corresponding Central Processing Unit (CPU), the method comprising:
   receiving, from a node deploying the virtual machine, a request for the virtual port of the software switch to be polled by the virtual machine, the request comprising a CPU identity identifying the CPU on which the virtual machine executes, the request comprising an indication of a clock frequency at which the CPU is set to operate;
   determining a number of packets in a queue associated with the virtual port; and
   adjusting the clock frequency of the CPU based on the number of packets in the queue.

2. The method according to claim 1, wherein the adjusting of the clock frequency comprises adjusting the clock frequency of the CPU based on the number of packets in the queue by decreasing the frequency when the number of packets in the queue is less than a first threshold value for indicating low load at the virtual machine and by increasing the frequency when the number of packets in the queue is greater than a second threshold value for indicating high load at the virtual machine.

3. The method according to claim 2, wherein the adjusting of the clock frequency by decreasing the frequency comprises decreasing the frequency until the clock frequency is equal to a first clock frequency indicating a lower limit for the clock frequency.

4. The method according to claim 2, wherein the adjusting of the clock frequency by increasing the frequency comprises increasing the clock frequency until the clock frequency is equal to a second clock frequency indicating an upper limit for the clock frequency.

5. The method according to claim 1, wherein the method further comprises:
   polling physical ports of the software switch to obtain one or more packets destined to the virtual machine;
   determining the virtual port to be polled by the virtual machine; and
   pushing the obtained one or more packets to the queue of the determined virtual port.

6. The method according to claim 1, wherein the adjusting of the clock frequency is performed at regular intervals.

7. The method according to claim 6, wherein the adjusting of the clock frequency is performed at regular intervals based on a number of times the polling of the physical ports has been performed.

8. The method according to claim 6, wherein the adjusting of the clock frequency is performed at regular intervals according to a time interval.

9. The method according to claim 5, wherein the method further comprises, after each time the polling of the physical port has been performed and when the number of packets in the queue is less than a third threshold value for indicating low load since last time the adjusting of the clock frequency was performed, incrementing a low load counter.

10. The method according to claim 2, wherein the first threshold and the second threshold are one of different and the same.

11. A software switch comprising a virtual port and being configurable to communicate with a virtual machine using the virtual port, the virtual machine being executable by a corresponding Central Processing Unit (CPU), the software switch comprising processing circuitry configured for:
  receiving, from a node deploying the virtual machine, a request for the virtual port of the software switch to be polled by the virtual machine, the request comprising a CPU identity identifying the CPU on which the virtual machine executes, the request comprising an indication of a clock frequency at which the CPU is set to operate;
  determining a number of packets in a queue associated with the virtual port; and
  adjusting the clock frequency of the CPU based on the number of packets in the queue.

12. The software switch according to claim 11, wherein the processing circuitry is configured for adjusting the clock frequency of the CPU based on the number of packets in the queue by decreasing the frequency when the number of packets in the queue is less than a first threshold value for indicating low load at the virtual machine and by increasing the frequency when the number of packets in the queue is greater than a second threshold value for indicating high load at the virtual machine.

13. The software switch according to claim 12, wherein the processing circuitry is configured for adjusting the clock frequency by decreasing the frequency until the clock frequency is equal to a first clock frequency indicating a lower limit for the clock frequency.

14. The software switch according to claim 12, wherein the processing circuitry is configured for adjusting the clock frequency by increasing the frequency until the clock frequency is equal to a second clock frequency indicating an upper limit for the clock frequency.

15. The software switch according to claim 11, wherein the processing circuitry is further configured for:
  polling physical ports of the software switch to obtain one or more packets destined to the virtual machine,
  determining the virtual port to be polled by the virtual machine; and
  pushing the obtained one or more packets to the queue of the determined virtual port.

16. The software switch according to claim 11, wherein the processing circuitry is configured for adjusting the clock frequency at regular intervals.

17. The software switch according to claim 16, wherein the processing circuitry is configured for adjusting the clock frequency at regular intervals based on a number of times the polling of the physical ports has been performed.

18. The software switch according to claim 16, wherein the processing circuitry is configured for adjusting the clock frequency at regular intervals according to a time interval.

19. The software switch according to claim 15, wherein the processing circuitry is further configured for:
  incrementing a low load counter, after each time the polling of the physical port has been performed and when the number of packets in the queue is less than a third threshold value for indicating low load since last time the adjusting of the clock frequency was performed.

20. The software switch according to claim 12, wherein the first threshold and the second threshold are one of different and the same.

21. A non-transitory computer storage medium storing an executable computer program comprising computer readable code units which, when executed on a software switch, cause the software switch to perform a method, the software switch comprising a virtual port and being configurable to communicate with a virtual machine using the virtual port, the virtual machine being executable by a corresponding Central Processing Unit (CPU), the method comprising:
  receiving, from a node deploying the virtual machine, a request for the virtual port of the software switch to be polled by the virtual machine, the request comprising a CPU identity identifying the CPU on which the virtual machine executes, the request comprising an indication of a clock frequency at which the CPU is set to operate;
  determining a number of packets in a queue associated with the virtual port; and
  adjusting the clock frequency of the CPU based on the number of packets in the queue.

* * * * *